Dec. 13, 1949     H. J. SCOTT     2,491,419
OVEN
Filed Jan. 30, 1947     2 Sheets-Sheet 2
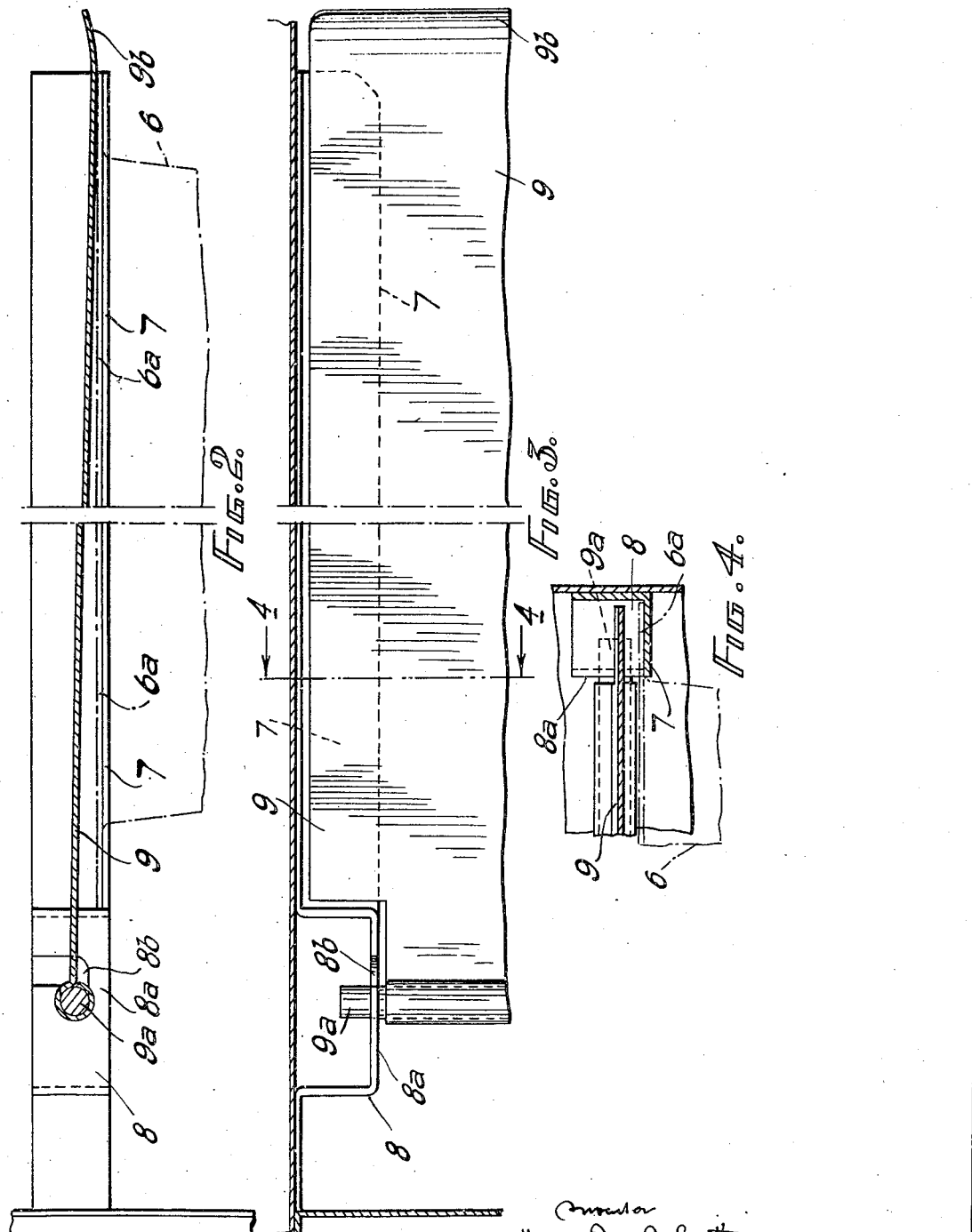

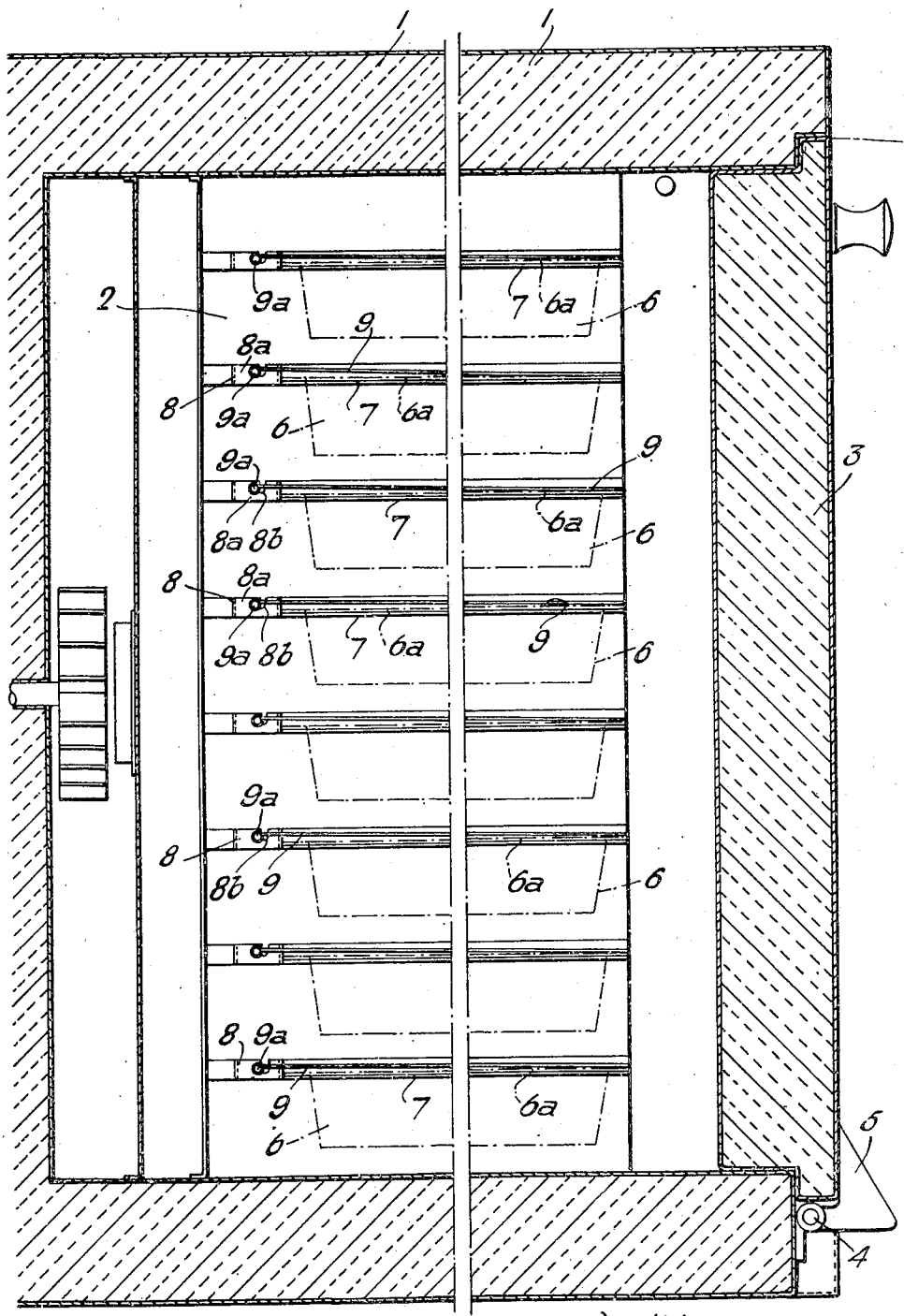
FIG. I.

Patented Dec. 13, 1949

2,491,419

UNITED STATES PATENT OFFICE 2,491,419

OVEN

Henry Joseph Scott, Surbiton, England, assignor to J. Lyons and Company Limited, London, England, a British company Application January 30, 1947, Serial No. 725,225
In Great Britain September 4, 1946

1 Claim. (Cl. 126—273)

This invention relates to ovens and has reference to ovens having a number of tiers or shelves each designed to support a container to be subjected to heat treatment.

In order that such ovens shall have maximum capacity the distance the shelves, which may be constituted by narrow runners, are separated from each other must be but little more than the depth of the containers to be heated.

In cases where the oven is to be used for heating food contained in the containers—for which the invention is specially applicable—it is desirable, and in many cases necessary, that the containers should be closed by a lid or cover during the heating operation and the object of the present invention is to provide a method of arranging lids for closing the containers which are separate from the containers but are positioned to close the containers when the latter are in situ in the oven, can be easily manipulated to permit the introduction and removal of the containers to and from the ovens, will not diminish the capacity of the oven and can themselves be readily removed from the ovens for cleaning purposes.

According to the invention the lids are constituted by cover plates which are made elements of the oven, instead of elements of the containers they are designed to close and are removably and hingedly connected to the interior framework of the oven, or lugs projecting therefrom, and so located that when the containers are slid into position in the oven the lids come into position closing the containers.

The arrangement is such that when it is desired to remove a container from the oven all that is necessary is to raise the appropriate lid slightly about its hinge to permit of the container being free to be drawn out, and when it is desired to insert a container the lid is again raised about its hinge, the container slid into position and the lid lowered, or allowed to fall, to its position closing the container.

The invention is illustrated in the accompanying drawings, wherein:

Figure 1 is a vertical section through an oven constructed according to the invention;

Figure 2 is a fragmentary view to a larger scale of an important detail;

Figure 3 is a plan of Figure 2; and

Figure 4 is a section on the line 4—4 of Figure 3.

Referring to these drawings the numeral 1 designates the lagged wall forming the heating chamber 2 of the oven which is closed by a door 3 hinged at its lower end upon horizontally disposed hinges 4. The door carries a suitable stop device 5 adapted to maintain the door horizontal when in its open position so that, when in its open position, the door constitutes a support upon which flanged containers 6 containing food or other material to be heated in the oven can be temporarily rested when they are withdrawn from the oven. To the side walls of the oven runners 7 are secured which serve to receive and support the containers 6, the side flanges 6a of which rest on these runners. At the rear end of these runners upstanding box-like structures 8 are provided and the inner walls 8a of these structures are provided with bayonet slots 8b designed to receive the hinge pins 9a which extend laterally from the rear ends of cover plates 9, the front ends 9b of which extend forwardly of the runners and are shaped suitably to facilitate manipulation. These cover plates are designed to constitute adequately fitting lids for the removable containers 6.

In operation when it is desired to introduce a tray into the oven the appropriate cover plate is lifted from the front about its hinge and the container is slid into position and on release of the cover plate it falls into position and acts as a cover or lid for the container. When it is desired to remove a container or containers the door 3 is opened to its horizontal position, the cover plates are lifted and the container drawn out and can be temporarily rested on the now horizontally positioned oven door.

It will be understood that just sufficient space is left between the cover plates and the bottoms of the containers when in situ in the oven to permit convenient operation.

The foregoing arrangement permits a steward or waitress to withdraw the containers from the oven as required unhampered by the necessity to manipulate and dispose of any lid or cover and the lids or covers can be easily removed for cleaning.

I claim:

An oven for heating material comprising a heating chamber, a plurality of containers, flanges on each of said containers, a door closing the front of said chamber, runners attached to the interior side walls of the chamber running from back to front for receiving said flanges of containers to be supported in the chamber, upstanding walls located at the rear ends of said runners and having slots therein for receiving hinge pins, cover plates constituting container lids, and hinge pins extending from each side of each cover plate adapted to be entered in said slots whereby each of said cover plates is operative to form the lid for a container introduced into said oven.

HENRY JOSEPH SCOTT.

REFERENCES CITED

The following references are of record in the file of this patent:

UNITED STATES PATENTS

| Number | Name | Date |
|---|---|---|
| 639,263 | Moon et al. | Dec. 19, 1899 |
| 990,684 | Walker et al. | Apr. 25, 1911 |
| 1,166,131 | Jeavons et al. | Dec. 28, 1915 |
| 1,710,433 | Seeley | Apr. 23, 1929 |
| 1,830,044 | Vandoren | Nov. 3, 1931 |
| 2,182,962 | Constantine | Dec. 12, 1939 |
| 2,453,939 | Schneider | Nov. 16, 1948 |

FOREIGN PATENTS

| Number | Country | Date |
|---|---|---|
| 226,979 | Great Britain | Jan. 8, 1925 |